Sept. 22, 1959     C. D. PETERSON     2,904,800
METHOD OF MAKING INSULATED COUPLING NUTS FOR PIPE UNIONS
Filed Oct. 22, 1953

INVENTOR.
CHARLES D. PETERSON
BY
Leech & Radue
ATTORNEYS

United States Patent Office 2,904,800
Patented Sept. 22, 1959

2,904,800

METHOD OF MAKING INSULATED COUPLING NUTS FOR PIPE UNIONS

Charles D. Peterson, Dallas, Tex., assignor to Universal Controls Corporation, Dallas, Tex., a corporation of Texas Application October 22, 1953, Serial No. 387,607

4 Claims. (Cl. 10—86)

This invention relates to insulated coupling nuts for pipe unions and the like and to a method of making the same.

It is a general object of the present invention to provide a novel and improved insulating coupling nut and method of making the same.

More particularly it is an object of the present invention to provide an insulating coupling nut including a threaded plastic insert and an enclosing sheet metal shell assembled in such a manner as to obtain maximum usage and stressing of each part.

An important object of the invention resides in the specific relationship of the insulating and sheathing parts whereby the latter takes the major stresses and reinforces the former against all but longitudinal stresses taken through the threads thereof.

Another important feature resides in the methods of forming and assembling the several parts whereby an improved product results.

Among the important features of the invention may be included the following:

Overall rust proofing of the shell.
Formation of the central shell opening after shaping.
Threading of the insulation insert after assembly.
Rigid assembly of the two parts.
Accurate centering of the shell bottom central opening with the threaded bore of the insert.
Uniform stressing of the insert material.
Provision for using light gauge metal in the shells of larger sized nuts by the use of heavy bottom reinforcing rings.

Other and further features and objects of the invention will be more apparent to those skilled in the art upon a consideration of the following specification and accompanying drawings wherein are disclosed a single exemplary embodiment of each of the inventions with the understanding that such changes and variations may be made therein as fall within the scope of the appended claims without departing from the spirit of the invention.

The advantages of using insulating couplings between various parts of pipe lines and between pipes and connected equipment, such as gas meters, domestic hot water heaters, and the like, for the purpose of reducing or eliminating corrosion by stopping the flow of stray electric currents which set up galvanic action are well recognized. In accordance with the present invention there is provided an improved and simplified insulating nut for use with standard pipe union parts and meter inlet swivels and intended to be substituted for the usual all metal nut.

Figure 1:
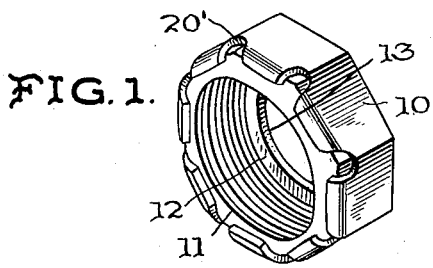
Fig. 1 is a perspective view of the finished insulating nut for pipe unions.

The nut of the present invention is a composite device comprising a threaded insulating core or insert and an enveloping cup or shell of rust proofed sheet steel, providing the coupling to a flanged tail piece, reinforcing the insulated insert and providing the necessary rigid "flats" for engagement by a wrench used in assembling the union. The entire union has not been illustrated, but Fig. 1 shows the complete nut assembly in which the steel shell is numbered 10 and the insulating insert 11. The insert is octagonal in plan as shown, but may be of any polygonal shape with a moderate number of sides. It is flat on the top and bottom and centrally bored and threaded as shown. The shell is cup-like and of the same general configuration as the insert which it receives with a press fit, the flat bottom surface of the insert engaging the inner face of the flat bottom wall 12 of the shell. This bottom wall has a large central hole 13 concentric to the threaded bore of the insert and of lesser diameter to provide an exposed annular area within the nut for engagement beneath the flanged head of the usual malleable iron tail piece of the union, which is threaded to fit on the end of a pipe.

Figure 2:
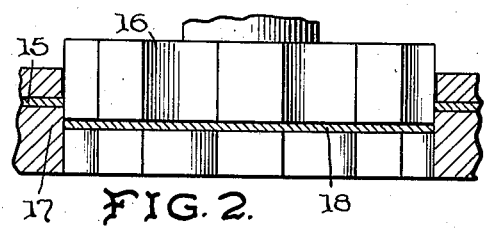
Fig. 2 is a vertical central section through a blanking die used in the first operation of forming the shell of the nut.
Figure 3:
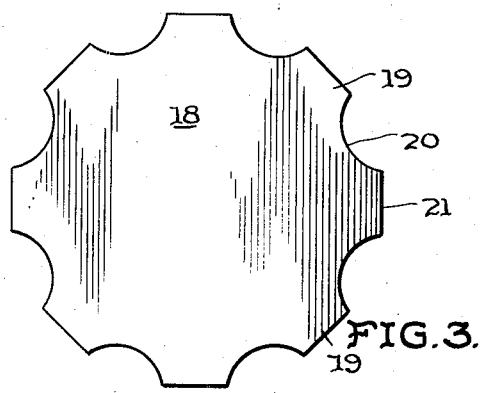
Fig. 3 is a plan view of the cut shell blank.

The characteristic features of this composite nut which make it unique and effective are best understood by a consideration of the manner of making and assembling the components thereof, and for this purpose consideration should be had of the remaining figures of the drawing. The metal shell or cup is stamped from mild steel and formed to the shape illustrated in Fig. 1 in a series of steps or stages, the first of which is illustrated in Fig. 2, where the metal sheet 15 of suitable steel of the desired thickness is clamped between upper and lower die members and a serrated disc 18 punched out therefrom by means of the punch element 16 in its cooperation with lower die part 17. Fig. 3 shows the flat blank generally circular in form with a plurality, eight in the present instance, of tabs or tongues 19 separated by arcuate notches 20 of shallow depth. The ends of the tongues rather than being conformed to the shape of the disc are preferably straight across, as seen at 21.

Figure 4:
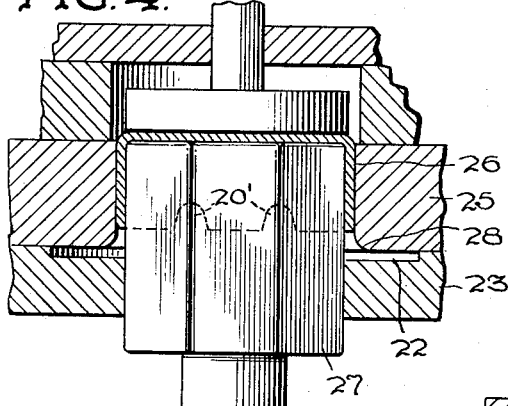
Fig. 4 is a vertical central section through the cupping die used in the second forming operation.

After the punching operation the blank 18 is placed in a blank nest 22 of the lower member 23 of a cupping die seen in Fig. 4, and positioned by the overlying upper member 25 having an appropriate octagonal opening 26 therein which shapes the blank when the punch 27 enters it from beneath and forces the blank therein, as shown. The blank in this figure appears as an inverted U resulting from the vertical sectional view. The rounded lower edges 28 of the upper die member cause the blank to flow smoothly into the opening and assume the cup shape shown. The blank periphery is compressed into the eight wrench engaging faces seen in Fig. 1 and the notches 20 between the tongues are constricted, as seen at 20′ in Fig. 4.

Figure 5:
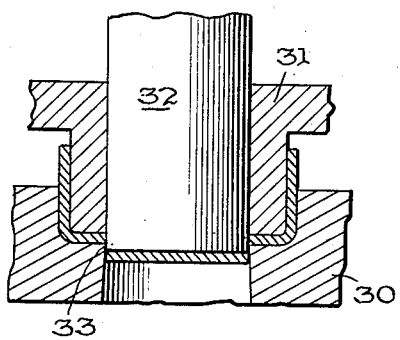
Fig. 5 is a vertical central section through the punching die used to form the central opening in the shell.

The open ended cup formed in the cupping dies of Fig. 4 is next clamped between a recessed lower die member 30 and an upper member 31 both centrally perforated to cooperate with a cutting punch 32 for removing a central disc against the sharp edge 33 of the lower die member as seen in Fig. 5. By holding the cup blank tightly between the two die members an accurate central positioning of the opening is effected and distortion of the blank eliminated. This is extremely important to prevent any eccentricity during the later threading operation or during rotation in the effort of applying the nut in use. At the conclusion of the punching operation the shell is appropriately treated to be corrosion resistant, such as by hot or electrolytic galvanizing, cadmium plating or the like.

Figure 6:
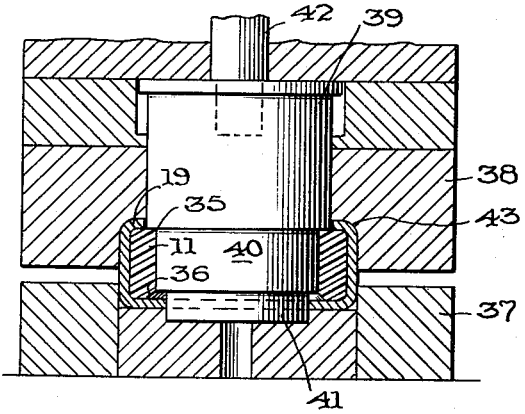
Fig. 6 is a vertical central section through the ascending die used to close the shell fingers about the insulating insert.

The core or insert 11 is formed to the shape shown in Fig. 6 from a suitable insulating material. Since in the operation of the union the two opposed parts received on the pipe ends are separated and insulated from each other by a resilient gasket fitted between them for the sake of tightness, the insulating material 11 in the union nut is never exposed to the material carried in the pipes and the selection can therefore be made solely on the basis of the most desirable mechanical and electrical characteristics. Considerable testing has shown that a nylon plastic such as FM–10001 has all of the desired features and is the best available because of its great physical strength approaching that of brass, its high elasticity and great tenacity. It has an average tensile strength of 10,900 lbs. per square inch at 70° F. and a shear strength of at least 9600 lbs. per square inch. It is suitable for continuous service at 250° F. and has a very minimum of cold flow. Its strength increases with lowered temperature. Its color is good and can be changed to any desired by suitable dyeing. It machines well and easily and has but a minimum of shrinkage after molding.

The insert material is molded in a conventional manner into a blank having a straight cylindrical bore, flat top and bottom walls and polygonal plan, and only minor rounding of the junction of the top and bottom walls with the outer faces. The bore is straight through and meets the upper wall in a sharp corner, as seen at 35 in Fig. 6, although at the bottom a substantial chamfer 36 is provided for a purpose which will later appear. The hot molding operation for forming the insert blank is terminated by the use of a cooling fluid and the center core is left in position during this operation to prevent any distortion of the opening.

The two components of the nut are so sized that considerable pressure is needed to force the insert into the cup, and this is applied until the corresponding bottom walls engage. The assembly is then placed in the nest in the lower die member 37 of Fig. 6, which houses the lower portion of the cup. The upper die member 38 carries the core portion 39, including the upper section closely slidable in the part 38, a portion 40 adapted to closely fit the bore in the insulating insert and a pilot portion 41 received in the correspondingly shaped opening in the lower die member.

This core assembly can be lowered ahead of the upper die portion 38 under the action of its independent manipulating rod 42 and the shoulder at the junction of parts 39 and 40 resting on the top of the insert may be used for the initial assembly operation. The pilot portion 41 is closely received in the opening in the bottom of the cup as well as in the guide portion in the lower die for alignment purposes, while the part 40 serves to exactly centralize and align the insert. The shoulder at the junction of the parts 39 and 40 holds down the insert during subsequent operations in its now accurate positioning. The die part 38 is now lowered and the rounded corners 43 at the junctions between the top wall of the octagonal die cavity and the side walls thereof engage the tips of the tabs or tongues 19 to curl them over for engagement against the top annular surface of the insert, as clearly seen in Fig. 6, tightly locking the somewhat elastic insert in position in the cup or shell which now engages it on two opposite faces and on all of the side walls, reinforcing and clamping it against distortion in use. No subsequent use ever results in any looseness between the parts.

Figure 7:
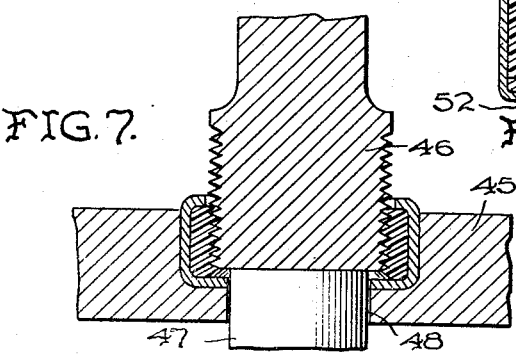
Fig. 7 shows the operation of tapping the insert after assembly.

The assembled nut still lacks the internal threads in the insulating part which are to engage over the threaded surface on one of the elements of the union. The final operation therefore comprises clamping the assembly into the nest of a lower die 45, as seen in Fig. 7 and running in a suitable tap 46. This tap is of the so-called bottom type and is provided with an elongated pilot portion 47 guided not only in the center hole in the bottom wall of the cup but also in a suitable pilot bore 48 in the lower die. This insures accurate cutting of the threads and the right angular alignment of their axis with the plane of the bottom of the nut. Threads made in this manner are much superior to those which could be molded in the insert during its forming operation, for they are not subject to shrinkage as the result of temperature changes during the molding operation nor any subsequent shrinkage which the plastic material may undergo in its cooling and hardening stages. Because of the chamfered junction of the bore in the insert with the bottom wall thereof, as seen at 36 in Fig. 6, the threads on the tap can extend entirely through the cylindrical portion of the bore and sever the cuttings completely, thus leaving a clean finish with no tramming to be done.

The resultant nut is extremely satisfactory. The material of the insert is self lubricating and does not stick to the metal threads of the companion part even after long usage. It is elastic and holds its shape even under severe misuse to which a number of the devices have been subjected. Pipe sections ten to fifteen feet long coupled near their center by unions incorporating a nut constructed in accordance with the present invention have been supported at their ends and weights of several hundred pounds applied at the center until the pipes took decided bends, all without harming the insulating insert or causing any leakage of the union even under high fluid pressures.

It is clear from Fig. 6 as well as other of the figures that the tongues or tabs 19 are sufficiently spaced radially from the bore in the insulating insert to insure against their coming into electrical contact with the portion of the union received in the threads.

Figure 8:
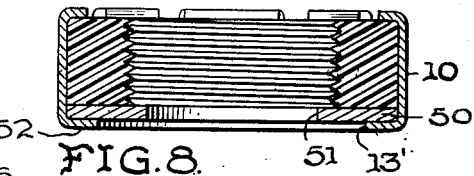
Fig. 8 is a longitudinal central section through a modified form of insulating nut, adapted for use in larger sizes and providing reinforcing for the shell at the bottom.

In Fig. 8 is shown a modification adapted to large size nuts where the strain in use as well as when being applied is greater. In order to avoid the need for heavier gauge metal in the shell with the attendant increased cost and weight as well as the added difficulties of fabrication and assembly the shell 10' is formed of the same weight metal as in the smaller sizes but is reinforced at the bottom, the area of greatest strain, by an internal reinforcing ring 50 having an external diameter such as to engage the flats of the shell tangentially on the inside to locate it securely in the shell. This ring is of heavier gauge metal than the shell as shown and is drilled or punched at 51 to the required diameter to fit over the tail piece of a union. This opening is less in diameter than that in the plastic insert which engages the upper face of the ring to clamp it in position in the shell against the bottom of the latter. Since the heavier material of ring 50 takes the longitudinal strain of the assembly, the hole 13' in the main shell is even larger than that in the plastic insert as shown so that the remaining annulus can be looked on as a narrow holding flange to maintain the ring in position. The manner of assembly of this type is believed to be obvious.

I claim:

1. The method of making an insulating nut for a pipe union having a threaded insulating insert entirely filling a closely fitting metal shell, comprising, punching a shell blank from a flat sheet to include a bottom and side wall parts with a tongue radiating from each part, cupping said blank in a die so the said walls and tongues form a polygonal plan normal to the bottom, punching a large circular hole centrally in the bottom sized to cooperate with a pipe union tail-piece, forming an insert of plastic having flat top and bottom walls and a central hole sized to be tapped to the desired thread diameter larger than the punched hole, chamfering the wall of the hole in the insert at one end, sizing the insert with side flats for a tight fit against said cup side walls, pressing the insert into the cup with the chamfered end against the cup bottom, mounting the assembly in a die nest, fitting a core closely into both holes and in a pilot in said nest to prevent eccentricity of shell and insert holes, moving a second die member along said core to bend said tongues around the upper edges of the insert sides and down onto the top annulus thereof to tightly hold the insert in the shell and then threading the hole in the insert with a tap having a pilot guided centrally by the walls of the shell bottom hole, said chamfer providing clearance for the tap adjacent the cup bottom.

2. The method as defined in claim 1 in which the insert is a plastic of high resilience and low cold flow, and pressing said tongues into said plastic to compress it slightly to insure against relative movement of the assembled parts.

3. The method outlined in claim 1 in which the insert is a nylon plastic and the pressure used to form the tabs thereover is approximately ten tons per tab to thereby compress the insert for a permanent tight fit in the shell.

4. The method of making an insulating nut for a pipe union in which an insulating insert is encased in a metal shell comprising punching and forming a sheet metal cup having a flat closed bottom and a plurality of flat vertical side walls arranged in polygonal form with an upstanding tab on the upper edge of each side wall, punching a large central opening in said bottom while clamping the bottom and sides in a die, forming a plastic insert with flat top and bottom surfaces and full vertical side walls to closely fit nonrotatively in said cup, forming a cylindrical central hole in said insert of less diameter than the cup bottom hole, punching an annulus of metal heavier than that of the shell with an outer diameter to fit tangent to the cup walls and an inner diameter less than that of the cylindrical hole in the insert, pressing the annulus and then the insert into the cup, engaging and clamping the cup bottom and the insert top between die parts including a core closely fitting said annulus hole and the insert hole, forming the said tabs over onto said top surface while the assembly is clamped and then threading the cylindrical hole in the insert using the annulus hole as an alignment guide.

References Cited in the file of this patent

UNITED STATES PATENTS

| | | |
|---|---|---|
| 248,975 | Wooten | Nov. 1, 1881 |
| 262,193 | Wooten | Aug. 1, 1882 |
| 549,510 | Hall | Nov. 12, 1895 |
| 680,991 | Crosby | Aug. 20, 1901 |
| 923,164 | Glauber | June 1, 1909 |
| 1,088,437 | Moore | Feb. 24, 1914 |
| 1,244,100 | Kortas | Oct. 23, 1917 |
| 1,299,415 | Anderson | Apr. 8, 1919 |
| 1,977,861 | Pond | Oct. 23, 1934 |
| 2,026,859 | Baynes | Jan. 7, 1936 |
| 2,131,319 | Greenholtz | Sept. 27, 1938 |
| 2,391,643 | Reutter | Dec. 25, 1945 |
| 2,437,843 | Van Ness | Mar. 16, 1948 |
| 2,569,333 | Peterson | Sept. 25, 1951 |
| 2,723,699 | Coates | Nov. 15, 1955 |
| 2,726,101 | Peterson | Dec. 6, 1955 |

FOREIGN PATENTS

| | | |
|---|---|---|
| 80,298 | Sweden | May 1, 1934 |
| 868,688 | Germany | Feb. 26, 1953 |